United States Patent
Vandenberghe et al.

(10) Patent No.: US 7,548,540 B2
(45) Date of Patent: Jun. 16, 2009

(54) DYNAMIC DISCOVERY OF ISO LAYER-2 TOPOLOGY

(75) Inventors: Alain Vandenberghe, Echirolles (FR); Willy Roche, Eybens (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 457 days.

(21) Appl. No.: 11/487,313

(22) Filed: Jul. 17, 2006

(65) Prior Publication Data

US 2007/0115967 A1 May 24, 2007

(30) Foreign Application Priority Data

Oct. 31, 2005 (EP) .................................. 05300885

(51) Int. Cl.
*H04L 12/28* (2006.01)
(52) U.S. Cl. ...................... 370/389; 370/487; 370/254
(58) Field of Classification Search ................. 370/487, 370/254, 330, 389, 535, 258, 360, 416, 395
See application file for complete search history.

(56) References Cited

U.S. PATENT DOCUMENTS

| | | | | |
|---|---|---|---|---|
| 6,016,313 | A * | 1/2000 | Foster et al. ................. | 370/330 |
| 6,137,793 | A * | 10/2000 | Gorman et al. ............. | 370/360 |
| 6,377,561 | B1 * | 4/2002 | Black et al. ................. | 370/330 |
| 6,510,157 | B2 * | 1/2003 | Kwok et al. ............. | 370/395.2 |
| 6,628,623 | B1 | 9/2003 | Noy | |
| 6,996,129 | B2 * | 2/2006 | Krause et al. ............... | 370/487 |
| 2002/0009078 | A1 * | 1/2002 | Wilson et al. ............... | 370/389 |
| 2002/0122442 | A1 * | 9/2002 | Suemura ..................... | 370/535 |
| 2005/0108444 | A1 * | 5/2005 | Flauaus et al. ............... | 710/15 |
| 2006/0268742 | A1 * | 11/2006 | Chu et al. ................... | 370/254 |
| 2006/0285548 | A1 * | 12/2006 | Hill et al. .................... | 370/416 |
| 2007/0086364 | A1 * | 4/2007 | Ellis et al. ................... | 370/258 |

OTHER PUBLICATIONS

Hwa-Chun et al., "Automatic Link Layer Topology Discovery of IP Networks," Communications, IEEE International Conference, Jun. 1999, pp. 1034-1038.
Yantao et al., "The Physical Topology Discovery for Switched Ethernet Based on Connections Reasoning Technique," Communications and Information Technology, IEEE International Symposium, Dec. 2005, pp. 42-45.
Yuzhao et al., "An Algorithm for Discovering Physical Topology in Single Subnet IP Networks," Advanced Information Networking and Applications, International Conference, Mar. 2005, pp. 351-354.
Zheng et al., "An Algorithm for Physical Network Topology Discovery," Journal of Computer Research and Development, vol. 39, No. 3, Mar. 2002, pp. 264-268.

* cited by examiner

*Primary Examiner*—Thong H Vu

(57) ABSTRACT

A method is provided of determining a layer-2 topology of an IT infrastructure which includes layer-2 interconnect devices having ports. A list of layer-2 interconnect devices available in the IT infrastructure is obtained. Uplink and non-uplink ports of layer-2 interconnect devices are determined. All the, or a subset of the, layer-2 interconnect devices are assigned to one initial group. The initial group is iteratively refined by selecting a layer-2 interconnect device and assigning all layer-2 interconnect devices reachable via its non-uplink ports to new subgroups.

9 Claims, 10 Drawing Sheets

DYNAMIC DISCOVERY OF ISO LAYER-2 TOPOLOGY

This application claims priority from European patent application 05300885.0, filed on Oct. 31, 2005. The entire content of the aforementioned application is incorporated herein by reference.

FIELD OF THE INVENTION

The present invention generally relates to methods and computer program products for determining an IT infrastructure topology, and for example, to methods and computer program products for determining a layer-2 topology of an IT infrastructure.

BACKGROUND OF THE INVENTION

Automatic discovery of physical topology information plays a crucial role in enhancing the manageability of modern IT infrastructures. The problem of determining the physical topology of an IT infrastructure primarily occurs in the context of network management when a failure in an IT infrastructure needs to be localized. To this end, topology maps of IT infrastructures are built by means of topology discovery programs which are usually integrated into IT infrastructure management platforms.

Physical network topology refers to the characterization of the physical connectivity relationships that exist among entities in an IT infrastructure. Discovering the physical layout and interconnections of network elements is a prerequisite to many critical network management tasks, including reactive and proactive resource management, event correlation, and root-cause analysis. Given the dynamic nature of today's IT infrastructures, keeping track of topology information manually is a daunting (if not impossible) task. Thus, effective algorithms for automatically discovering physical network topology are necessary. Earlier work has typically concentrated on discovering logical (i.e. layer-3) topology, which implies that the connectivity of all layer-2 elements (switches and bridges) is ignored. For example, consider a fault monitoring and analysis application running on a central IT infrastructure management platform. Typically, a single fault in the network will cause a flood of alarm signals emanating from different interrelated network elements. Knowledge of element interconnection is essential to filter out secondary alarm signals and correlate primary alarms to pinpoint the original source of failure in the network.

Furthermore, a full physical map of the network enables a proactive analysis of the impact of link and device failures. Early identification of single points of failure that could disrupt a large fraction of the user community allows the network manager to improve the survivability of the network (e.g., by adding alternate routing paths) before outages occur.

Despite the critical role of topology information in enhancing the manageability of modern IP networks, none of the network management platforms available on the market today offers a general-purpose tool for automatic discovery of physical IP network connectivity. Most systems (including Hewlett Packard's OpenView Network Node Manager) feature an IP (Internet Protocol) mapping functionality for automatically discovering routers and subnets and generating a network (i.e. ISO layer-3) topology showing the router-to-router interconnections, router interface-to-subnet relationships and layer-3 addressable end devices. Determining a layer-3 topology is comparatively easy since routers need to be explicitly aware of their neighbor routers in order to perform their basic function, namely forwarding IP packets to other routers and IP addressable end devices. Therefore, standard routing information is adequate to capture and represent layer-3 connectivity. However, layer-3 topology only covers a small fraction of the interrelationships in an IP network, since it fails to capture the complex interconnections of layer-2 network elements (e.g., switches and bridges) that are included in all subnets.

The lack of automated solutions for capturing physical (i.e. layer-2) topology information means that network managers are routinely forced to manually input such information for each management tool that they use. Given the dynamic nature and the ever-increasing complexity of today's IT infrastructures, keeping track of topology information is a daunting (if not impossible) task. This situation clearly mandates the development of effective, general-purpose algorithmic solutions for automatically discovering the up-to-date physical topology of an IP network.

SNMP-based algorithms for automatically discovering network layer (i.e. layer-3) topology are featured in many common network management tools, such as Hewlett Packard's OpenView and IBM's Tivoli. Other commercially available tools for discovering layer-3 network topology using SNMP include Actualit's Optimal Surveyor and the Dartmouth Intermapper.

Recognizing the importance of layer-2 topology, a number of vendors have recently developed proprietary tools and protocols for discovering physical network connectivity, such as Cisco's Discovery Protocol (CDP), which is an ISO-OSI layer-2 network protocol used by Cisco routers to obtain protocol addresses of nearby devices. CDP runs on all Cisco devices, but not on devices of other manufacturers. Therefore, CDP cannot be employed in networks with elements of different vendors. CDP can be used on all media that support Subnetwork Access Protocol (SNAP): this includes Ethernet, Frame Relay and Asynchronous Transfer Mode (ATM). Each device which is configured for CDP periodically sends messages (advertisements) to a multicast address. Each device sends to at least one further address at which it may receive SNMP messages. The advertisements contain information about the time to life and the holdtime of the packet. The default value for a Cisco router is 60 seconds.

Normally, the topology of only a part of an IT infrastructure needs to be discovered. Administrators are able to control the scope of the topology function. This includes restricting use to certain sub-networks or restricting the routes used by specifying "boundary systems" (e.g., gateway routers to a public network). Failure to limit a topology-discovery process can overload a network and the higher-level network in which it participates.

In U.S. Pat. No. 6,516,345 a method for determining actual physical topology of network devices in a network is disclosed. A discovery mechanism determines a set of network addresses for identifying devices within a network. Based on the set of network addresses, the discovery mechanism identifies a group of devices that are associated with the network. Layer-2 and layer-3 configuration information is gathered from the group of devices to identify possible neighboring devices within the network.

In U.S. Pat. No. 6,003,074 a method is disclosed which enables a mapping of devices that are interconnected in a subnetwork between a first node and a second node. Initially, the method determines a subnetwork that includes both the first and second nodes and devices comprising the subnetwork. Next, the method determines a list of devices in the subnetwork which have seen traffic from the first node, and port identities on which the traffic has been experienced. A map between the first and the second node is obtained by selecting intermediate devices and figuring out where they are located by comparing at which ports traffic has been experienced.

U.S. Pat. No. 5,729,685 discloses an asynchronous transfer mode (ATM) network or the like employing a method and apparatus for automatically determining the topology of the network. The method and apparatus provides link advertisement messages for each switch in the network transmitting on each of its ports (without processing intervention by intermediate switches). The link advertisement messages are received by neighbor switches and forwarded to a topology manager. The topology manager constructs network topology profile information based on received link advertisement messages. Further, the topology manager is able to verify bidirection links based on the link advertisement messages received.

U.S. Pat. No. 5,297,138 discloses a method of determining the physical topology of devices on a network. All the devices on the network are identified. A first device is selected. For each port of the first device a connection structure is recursively determined for all devices which communicate to the first device through the port.

U.S. Pat. No. 6,377,987 discloses a mechanism for determining the actual physical topology of network devices in a network. To determine a physical topology, a discovery mechanism determines a set of network addresses for identifying devices within a network. Based on the set of network addresses, the discovery mechanism identifies a group of devices that are associated with the network. Layer 2 and layer 3 configuration information is gathered from the group of devices to identify possible neighboring devices within the network. The configuration information is then processed to generate topology information that identifies true neighboring devices and the actual links that exist between each of the neighboring devices. The mechanism eliminates misleading information and prevents generation of incorrect topologies.

U.S. Pat. No. 6,108,702 discloses a monitoring system for determining accurate topology features of a network, and methods of operating the monitoring system. In the preferred embodiment, the system creates an accurate topology map of a given network by: obtaining a list of managed network devices; identifying trunk ports, link channel ports, and trunk channel ports; identifying link port and node ports; determining connections between the ports; storing the collected information; and displaying the network topology.

U.S. Pat. No. 5,708,772 discloses a computer-implemented method and apparatus for determining a topology of a network. Signals are received from all source hubs in the network, wherein each of the signals contains connection information for the source hubs including destination hubs to which the source hubs are coupled, and a corresponding connection port on the source hubs through which the destination hubs are coupled. The connection information is processed by locating all unitary connections in the connection information. Subsequently, if the connection information is not empty and there are additional unitary connections in the connection information, then the foregoing steps are repeated until there are no more unitary connections or the processed connection information is empty.

SUMMARY OF THE INVENTION

A method is provided of determining a layer-2 topology of an IT infrastructure including layer-2 interconnect devices having ports. A list of layer-2 interconnect devices available in the IT infrastructure is obtained. Then, uplink and non-uplink ports of layer-2 interconnect devices are determined, and all the, or a subset of the, layer-2 interconnect devices are assigned to one initial group. The initial group is iteratively refined by selecting a layer-2 interconnect device of the group and all layer-2 interconnect devices reachable via its non-uplink ports are assigned to new subgroups.

According to another aspect, a computer system is provided for determining a layer-2 topology of an IT infrastructure including layer-2 interconnect devices having ports. The computer system is programmed to obtain a list of layer-2 interconnect devices available in the IT infrastructure. Uplink and non-uplink ports of layer-2 interconnect devices are determined, and all the, or a subset of the, layer-2 interconnect devices are assigned to one initial group. The initial group is iteratively refined by selecting a layer-2 interconnect device of the group and all layer-2 interconnect devices reachable via its non-uplink ports are assigned to new subgroups.

According to another aspect, a computer program product is provided which is either in the form of a machine-readable medium with program code stored on it, or in the form of a propagated signal including a representation of program code. The program code is arranged to carry out a method, when executed on a computer system, of determining a layer-2 topology of an IT infrastructure which includes layer-2 interconnect devices having ports. A list of layer-2 interconnect devices available in the IT infrastructure is obtained. Uplink and non-uplink ports of layer-2 interconnect devices are determined. All the, or a subset of the, layer-2 interconnect devices are assigned to one initial group. The initial group is iteratively refined by selecting a layer-2 interconnect device and assigning all layer-2 interconnect devices reachable via its non-uplink ports to new subgroups.

Other features are inherent in the methods and products disclosed or will become apparent to those skilled in the art from the following detailed description of embodiments and its accompanying drawings.

BRIEF DESCRIPTION OF THE DRAWINGS

Embodiments of the invention will now be described, by way of example, and with reference to the accompanying drawings, in which.

The drawings and the description of the drawings are of embodiments of the invention and not of the invention itself.

DESCRIPTION OF THE PREFERRED EMBODIMENTS

Figure 1:
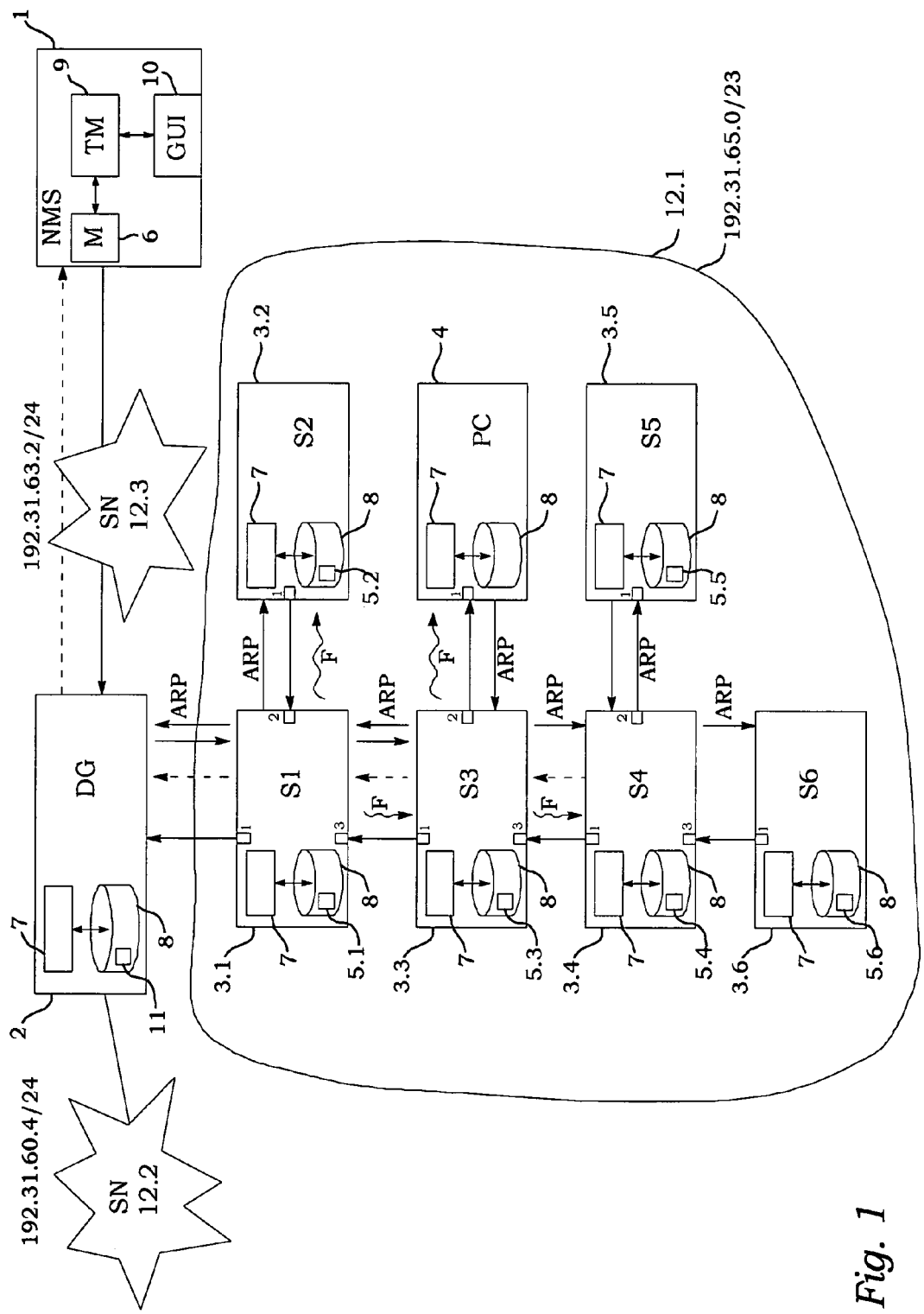
FIG. 1 shows an IT infrastructure including several subnets, whereby the layer-2 topology of one of the subnets is to be determined, according to embodiments of the invention.

FIG. 1 shows an IT infrastructure including end devices, such as mainframes, PC and interconnect devices, such as routers, switches, bridges, hubs and repeaters. However, before proceeding further with the description of FIG. 1, a few items of the embodiments will be discussed.

In some of the embodiments, a layer-2 topology of an IT infrastructure is determined. To this end, a list of layer-2 interconnect devices available in the IT infrastructure is obtained. Uplink and non-uplink ports of layer-2 interconnect devices are determined. Initially, all the layer-2 interconnect devices, or a subset thereof, are assigned to one initial group. This initial group is iteratively refined by selecting a layer-2 interconnect device and assigning all layer-2 interconnect devices reachable via its non-uplink ports to new subgroups.

Explaining the functioning of IT infrastructures is typically approached by means of what is referred to as the ISO-OSI layer model. This model, which includes seven layers, is a reference model in which one layer resorts to functionalities provided by the layer below. The degree of abstraction increases when going up from layer 1, which is the bottommost layer, to layer 7, the uppermost layer. The three bottom layers, which are the physical layer, the data link layer and the network layer, are of relevance for the present invention and are therefore discussed in more detail below.

The physical layer, also referred to as layer-1, defines all electrical and physical specifications for network devices. This includes the layout of pins, voltages, and cable specifications. Hubs and repeaters are the interconnect devices operating on the physical layer. The major functions and services performed by the physical layer refer to the establishment and termination of a connection to a communications medium, whereby the communication resources are effectively shared among multiple users, for example contention resolution. A further function is the modulation, or conversion between the representation of digital data in user equipment and the corresponding signals transmitted over a communications channel.

The data link layer, also referred to as layer-2, provides the functional and procedural means to transfer data between network components and to detect and possibly correct errors that may occur in the physical layer. The addressing scheme is physical which means that the addresses are hard-coded into the network cards at the time of their manufacture. The addressing scheme, typically MAC (Medium Access Control) addresses, is flat, and is used in the context of the Ethernet protocol. Other examples of data link protocols are HDLC (High-Level Data Link Control) and ADCCP (Advanced Data Communication Control Procedure) for point-to-point or packet-switched networks and LLC (Logical Link Control) and ALOHA for LANs (local area networks). The data link layer is the layer at which bridges and switches operate by reading the MAC addresses of incoming data frames (the data units on the data link layer) and forwarding them according to their forward tables. A forward table of a layer-2 interconnect device (e.g. bridge or switch) stores via which ports which other devices (layer-2 interconnect devices and end devices) are reachable. To put it differently, a forward table stores via which ports it "sees" other devices. It should be mentioned that a layer-2 interconnect device not only sees its direct neighbors via a port but all the devices which are reachable via this port, whereas physical connectivity is only provided among locally attached network components.

The term "layer-2 topology" of an IT infrastructure, as used herein, is defined as all layer-2 addressable end devices (usually devices having a MAC address) and all interconnect devices operating at layer-2 (e.g. switches, bridges) and how they are interconnected, i.e. via which ports they are interconnected. Since routers, actually operating at layer-3, are layer-2 addressable, they are also part of a layer-2 topology of an IT infrastructure. Incidentally, at layer-2, the headers and trailers of frames (data units of layer-2) are not changed by the switches or bridges which forward the frames, so that bridges and switches operate transparently in that they only check up the layer-2 header and forward the frames according to the information stored in their forward tables. The term "forward table" as used herein refers to information indicating a layer-2 device via which port to forward incoming frames.

The network layer, also referred to as layer-3, provides the functional and procedural means of transferring variable length data sequences from a source to a destination via one or more networks while maintaining the quality of service requested by the transport layer (=the layer above the network layer). The network layer performs network routing, flow control, segmentation/desegmentation, and error control functions. Routers are the network devices operating at this level. The network layer sends data throughout the extended network and makes the Internet possible. It should be mentioned that there are also switches, so-called IP switches, operating at layer-3, which means that they read IP addresses of packets (data units of layer-3) and forward them accordingly. The addressing of layer-3, the so-called IP addressing, is a logical addressing since the values are chosen by a network engineer or a DHCP (dynamic host configuration protocol) server which enables IP addresses to be dynamically assigned to end devices. The protocol pertaining to the network layer is the so-called Internet Protocol (IP) and data units of the network layer are referred to as IP packets.

The term "layer-3 topology" of an IT infrastructure, as used herein, is defined as all layer-3 addressable end devices (i.e. end devices having an IP address) and interconnect devices which forward information according to IP source and destination addresses of IP packets (i.e. routers). The term "layer-3 topology" further refers to the interconnection between all layer-3 addressable end devices and routers. Incidentally, a router replaces the source MAC address of incoming layer-2 frames with its own MAC address and thereby also affects the layer-2 control information. It also decreases the TTL counter (time to live counter), which is a counter used to limit IP packet lifetimes. It is supposed to count time in seconds, allowing a maximum lifetime of 255 seconds. It is decremented on each hop (from one router to another) and is supposed to be decremented multiple times when queued for a long time in a router. In practice, it just counts hops and when it hits zero, the packet is discarded and a warning packet is sent back to the source host. This feature prevents IP packets from wandering around forever, something which might happen if routing tables become corrupted. The term "routing table", as used herein, refers to information indicating to a router where to forward incoming IP packets. Therefore, a router does alter IP packets, whereas at layer-2, the switches operate invisibly in that they do not change control information of frames or packets.

The seven OSI layers use various forms of control information to communicate with their peer layers in other computer systems. This control information consists of specific requests and instructions that are exchanged between peer OSI layers. Headers and trailers of data units at each layer are the two basic forms to carry the control information. Headers are prepended to payload data that has been passed down from upper layers, whereas trailers are appended to payload data that has been passed down from upper layers. An ISO-OSI layer does not necessarily have to attach a header or a trailer to payload data coming from upper layers. Normally, the physical layer does not attach any header or trailer; its task is to transmit the data via the medium. Each layer may add a header and a trailer to its payload data, which consists of the upper layer's header, trailer and payload data as it proceeds through the layers. The headers contain control information that specifically addresses layer-to-layer communication. Headers, trailers and payload data are relative concepts, depending on the layer that analyzes the data unit. For example, the header of the transport layer contains information that only the transport layer sees. All other layers below the transport layer regard the transport header as part of their payload data. For instance, at the network layer, a data unit consists of a layer-3 header and trailer and payload data. At the data link layer, however, all the information passed down by the network layer (the layer-3 header, trailer and the payload data) is treated as payload data. In other words, the payload data portion of an information unit at a given OSI layer potentially may contain headers, trailers, and payload data from all higher layers. This concept is referred to as encapsulation.

The IT infrastructures considered herein are preferably IP networks running the TCP/IP protocol suite. Every host and router on the Internet has an IP address, which encodes its network number and host number. The combination is unique: in principle, no two machines on the Internet have the same IP address. However, the invention is not limited to network devices which are on the (public) Internet. Embodiments of the invention are directed to any network devices having IP addresses and running the IP protocol. IP addresses are 32 bits long and are used in the source address and destination address fields of headers of IP packets. A network may be divided into several LANs by means of sub-netting. To implement sub-netting, a main router which divides incoming data units to the different LANs needs a subnet mask that indicates the split between network+subnet number and host. Subnet masks, like IP addresses, are also written in dotted decimal notation. For example, the subnet mask 255.255.252.0 means that the network+subnet part makes up 22 bits and the host part makes up 10 bits, or in other words, the IP addresses of the hosts of the same subnet only differ in the last 10 bits, all hosts of the subnet are identical in the first 22 bits.

In some of the embodiments, the IT infrastructure whose layer-2 topology is to be determined has one default gateway, and all layer-2 interconnect devices and end devices are assigned to this default gateway, whereas in other embodiments, there are several default gateways in the IT infrastructure and each layer-2 interconnect device (and end device) is associated with one of them. The set of interconnect devices assigned to one default gateway form a tree-like structure (or a tree-like structure can be calculated on it by means of a spanning tree protocol, as will be explained below). Initially, all interconnect devices having the same default gateway are assigned to one initial group.

When transmitting data via the Internet, the network layer adds, among other things, the IP source and destination address of the data unit, and, subsequently, the data link layer adds, among other things, the MAC source and destination address. When a data unit, on the way to its destination, arrives at a layer-2 interconnect device, such as a switch or bridge, the interconnect device checks up the layer-2 header for the destination MAC address and forwards the frame via a port according to information stored in its forward table. A layer-2 interconnect device does not take IP addresses into account since they relate to layer-3 and are solely taken into account by routers. When a data unit arrives at a router, it reads its destination IP address and routes the data unit according to the routing table. A router also replaces the original source MAC address of the data unit received with its own MAC address as the new source MAC address in the MAC address field of the data unit.

A common forwarding mechanism on layer-2, which is used in some of the embodiments, is referred to as "backward learning" by means of which a switch learns to forward incoming frames via its ports. It is assumed that a frame is sent from switch A via several intermediate switches to switch B. When a frame arrives at a switch and its destination MAC address is not stored in the forward table, then the frame is forwarded via all ports, except the incoming port. This way of forwarding is also referred to as "flooding". In the forward table of the intermediate switches, the port via which the frame arrives is associated with the source MAC address of the frame. If, afterwards, a frame is sent back from switch B to switch A, the intermediate switches already know via which ports to forward the data units since they have associated the port via which they received the frame with its source MAC address.

The topology of the network may change as end devices and layer-2 interconnect devices are powered up and down and moved around. To handle dynamic topologies, whenever a forward table entry is made (which associates the source MAC address of an incoming frame with the port via which the frame is received), the arrival time of the frame is noted in entries of the forward table. Whenever a frame whose source MAC address is already in the table arrives, its entry is updated with the current time. Thus, the time associated with each entry indicates the last point of time a frame with a certain source MAC address was seen on a certain port. Periodically, a process in a layer-2 interconnect device scans its forward table and purges all entries more than a few minutes old. This aging mechanism is also used to evict infrequent destination MAC addresses from the forward tables; thus, the sets of MAC addresses found in these tables are not necessarily complete.

One approach to keep the forward tables complete, which is used in some of the embodiments, is based on generating extra network traffic across switches (using the IP ping mechanism) to ensure that the address forwarding tables are adequately populated. In this way, if a computer is unplugged from its LAN, moved around in the building, and plugged in again somewhere else, within a few minutes the switches will be back in normal operation (not requiring any flooding), without any manual intervention. This procedure also means that if a network device is quiet for a few minutes, any traffic sent to it will have to be flooded until the end device itself sends a frame.

In some of the embodiments, switches and bridges are connected among each other in such a way that circles occur so that redundant paths exist in the network. In this context, the flooding may entail that frames are forwarded in an infinite loop. Therefore, a spanning tree is defined by means of a spanning-tree protocol on the network so that unambiguous paths between devices in the network are induced. A spanning-tree protocol is a link management protocol that provides path redundancy while preventing undesirable loops in the network. For an Ethernet network to function properly, only one active path should exist between two stations. Multiple active paths between stations cause loops in the network. If a loop exists in the network topology, messages may be duplicated again and again in the context of flooding. To provide path redundancy, a spanning-tree protocol is used to define a tree that spans all switches in an extended network. A spanning-tree protocol forces certain redundant data paths into a standby (blocked) state. If one network segment in the spanning-tree protocol becomes unreachable, the spanning-tree protocol reconfigures the spanning-tree topology and re-establishes the link by activating the standby path.

In the context of a spanning-tree protocol, layer-2 interconnect devices exchange information about their operating state and the active topology of the network. This exchange of information happens via so-called bridge protocol data units (BPDUs) and leads to the following results: unambiguous determination of a root-bridge, unambiguous assignment of a port for each LAN in such a way that the LAN may communicate only via this designated port with the root bridge, unambiguous assignment of a root port for each bridge in such a way that the bridge may only be able to communicate with the root bridge via this port, and removal of loops in the network by deactivating of corresponding connection ports. In some of the embodiments, the IT infrastructures considered herein have a tree structure, whereas in other embodiments, a spanning-tree protocol is run to avoid infinite loops when forwarding frames.

On layer-3, the routers perform routing algorithms, such as distance vector routing, link state routing, broadcast routing, multicast routing etc. (see, for example, Tanenbaum, A. S., "Computer Networks", p. 350-384, Pearson Education International, 2003) in which they take into account the source and destination addresses of IP packets and forward them according to routing information stored in routing tables.

When a router is booted, its first task is to learn who its neighbors are. It accomplishes this goal by sending a special HELLO packet on each point-to-point line. The router on the other end is expected to send back a reply indicating who it is. It should be mentioned that since each router knows which routers are its neighbors, a layer-3 topology may be created with comparatively little effort. A switch, in contrast, only stores in its forward table via which ports it may reach other switches. Hence, it does not know its direct neighbors and therefore, creating a layer-2 topology is, in general, more complicated than creating a layer-3 topology.

To create a layer-2 topology, the data which is locally stored in the forward tables of the switches is compiled in a network management station. To this end, SNMP (simple network management protocol) is used which enables management information from individual network devices to be queried. The management information is stored in MIBs (management information bases), which are organized in a tree-like structure, of the network devices, and the devices have management IP addresses via which the management information stored in the MIBs may be queried.

In some of the embodiments, it is assumed at all layer-2 and layer-3 interconnect devices and all end devices are provided with a management IP address by means of which the network management station may query the information stored in the MIBs of the network devices. Especially the MIB II database entries, which are part of the MIB, provide information for determining the layer-2 topology of the IT infrastructure. Furthermore, the management information stored in the MIBs may also be changed by means of the SNMP-manager in a central network management station. The MIBs of the network devices are locally administrated by SNMP-agents which are connected to the manager. In particular, the MIBs store the forward tables of the switches which are needed to obtain the layer-2 topology map of the network.

In some of the embodiments, a layer-2 topology of an IT infrastructure is determined. To this end, a list of layer-2 interconnect devices available in the IT infrastructure is obtained. Uplink and non-uplink ports of each layer-2 interconnect device is determined. In the beginning, all layer-2 interconnect devices having the same default gateway are in one initial group. This group is iteratively refined by selecting a layer-2 interconnect device and assigning all devices reachable via its non-uplink ports to new subgroups. The refinement of a subgroup stops when all layer-2 interconnect devices of this subgroup have been queried about the reachability of the other devices (both interconnect and end devices) within their subgroups.

In some of the embodiments, there are also end devices provided. Since the IT infrastructures considered herein whose layer-2 topology is to be determined are in a tree-like structure (or a tree-like structure may be implicitly established by a spanning tree protocol), the end devices are considered as the leaves of the tree. Since an end device is not an interconnect device, it can bring no information about the topology (it can only be a termination point (leaf) in the tree-like structure of the IT infrastructure). Therefore, an end device is not selected in the refining process. Yet, once a layer-2 interconnect device is selected, it will be queried in its forward tables not only about other interconnect devices, but also about end devices. This will make sure that the end devices are placed in their relevant subgroup eventually.

In some of the embodiments, a list of layer-2 interconnect devices and end devices it is obtained by manually entering the layer-2 interconnect devices and end devices for which the topology is to be determined, whereas in other embodiments the list is obtained by checking IP addresses of the IT infrastructure.

In other embodiments, broadcast pings are sent from a network management station to figure out which network devices are available. After the list of layer-2 interconnect devices and end devices is obtained, the layer-2 interconnect and end devices are polled in order to generate traffic which means, as a consequence, that the forward tables of the switches are filled with information concerning the port via which a frame with a MAC destination address is forwarded.

In some of the embodiments, initially, a list of end devices is not necessary. The only information about end devices is their MAC address found in the forward tables of the layer-2 interconnect devices. The end devices are then only identified via their MAC address.

After the traffic has been generated, the forward tables of the individual layer-2 interconnect devices are queried via SNMP. The forward tables indicate the ports via which specific other layer-2 interconnect devices or end devices are reachable. The layer-2 interconnect devices and end devices are hierarchically structured so that polling requests coming from beyond a root device, such as a default gateway, lead to traffic that fills the forward tables.

Another sort of traffic typically occurring in IP networks are ARP (address resolution protocol) requests. If a network device wants to send a message to another device, it needs both, the IP and the MAC address of the other device. If it only knows the IP address, the address resolution protocol enables mapping known IP addresses to unknown MAC addresses within a subnet. It should be mentioned that IP addresses alone are not enough for sending packets because the data link layer hardware does not understand IP addresses. If an end device or router wants to know the MAC address of another end device or router, but only knows its IP address, for example IP address 192.31.65.0, then it broadcasts an ARP request. It should be mentioned that, in some of the embodiments, IP addresses are dynamically assigned to network devices, whereas MAC addresses are hardcoded in a network card of a device by the manufacturer. The MAC address of a device does not change and is world-wide unique. The IP address is assigned by a network administrator to a network device or is requested from a DHCP (Dynamic Host Configuration Protocol) server by a network device during booting.

An ARP cycle includes a request and a reply. At first, a device A which wants to figure out the MAC address of another device B whose IP address is known checks up its ARP cache whether the address-pair MAC-IP-address is stored there. In this cache, the determined address pairs are kept for a period of time in order not to produce unnecessary network traffic. If the MAC address is not available in the cache, A sends an ARP request to the broadcast address of the subnet, i.e. all network devices connected to this subnet receive this request. The ARP request contains: "Sender with MAC address X and IP address A is looking for the MAC address of the device with the IP address B". The broadcast will arrive at every device on the subnet and each one will check its IP address. The one having IP address B, and only this one, will respond with: "IP address B corresponds to MAC address Y" in its ARP reply. For the close future, A notes this address pair in its cache. Since other devices in the subnet may also want to ask for this address pair, all devices note this pair. In this way, the host sending an ARP request with an IP address receives the corresponding MAC address. If a switch sends an ARP request in the subnet, then the broadcast entails that its MAC address may be conveyed to any other switches in the subnet. Due to ARP requests, a forward table of a switch may contain MAC addresses stemming from any other switch in the subnet.

In some of the embodiments, in order to define a hierarchy in the IT infrastructure, one network device is marked as a root device. This device is typically the default gateway via which the IT infrastructure is connected to other routers. The default gateway is also considered as a beacon and is detectable by any layer-2 interconnect device. In the case of end devices, the problem is to locate them by determining to which port of which switch they are connected. In order to be able to reconstruct the hierarchy of the IT infrastructure, the ports of layer-2 interconnect devices are divided into uplink and non-uplink ports. An uplink port is the port of each layer-2 interconnect device via which the default gateway is reachable. It should be mentioned that via the uplink port of each switch other switches may also be reachable. All the other ports are non-uplink ports, which are either downlink ports leading to a layer-2 interconnect device or ports connected to an end device.

In some of the embodiments, after the uplink and non-uplink ports of the layer-2 interconnect devices have been determined, all layer-2 interconnect devices having the same default gateway are assigned into one initial group. This group is refined by selecting one layer-2 interconnect device, querying it about all other devices within the same group, and reassign those which are reachable via non-uplink ports into a (new) subgroup (per non-uplink port). Thus, all devices reachable via non-uplink ports are removed from their previous group, and removed from the query list of the remaining layer-2 interconnect devices from their previous group. Furthermore, it is recorded via which ports the subgroups have been induced. This process of refinement is iteratively performed and stops when all layer-2 interconnect devices of a subgroup have been queried about the reachability of the other devices (both interconnect and end devices) within the subgroup. In each refinement step, it is recorded via which ports the new subgroups have been induced.

To reconstruct the topology, it is started with the layer-2 interconnect device closest to the default gateway in terms of layer-2 topology. That is to say, the interconnect layer-2 switche(s) that is/are still belonging to an initial group (e.g. was not reassigned to any subgroup due to any other layer-2 interconnect device reaching it through a non-uplink port). For each such element, the next level in the hierarchy is found by checking the ports that induced subgroups. For the next level layer-2 elements, the uplink port to the previous layer is assumed to be the port via which the default gateway is reached. Recursively, on the ports and subgroups, the full topology is obtained which is displayed, in some of the embodiments, as web pages, whereas in other embodiments it is displayed as an image or stored in a database or file.

Some of the embodiments of the computer program product with program code for performing the described methods include any machine-readable medium that is capable of storing or encoding the program code. The term "machine-readable medium" shall accordingly be taken to include, for example, solid state memories and, removable and non removable, optical and magnetic storage media. In other embodiments, the computer program product is in the form of a propagated signal comprising a representation of the program code, which is increasingly becoming the usual way to distribute software. The signal is, for example, carried on an electromagnetic wave, e.g. transmitted over a copper cable or through the air, or a light wave transmitted through an optical fiber. The program code may be machine code or another code which can be converted into machine code, such as source code in a multi-purpose programming language, e.g. C, C++, Java, C#, etc. The embodiments of a computer system may be commercially available general-purpose computers programmed with the program code.

Returning now to FIG. 1 which shows an IP subnet 12.1 whose layer-2 topology is to be determined. There is a default gateway 2 which provides an interface to the subnet 12.1 and to subnets 12.2 and 12.3. Moreover, the default gateway 2 has an IP address for each subnet: Subnet 12.1 is defined via IP address 192.31.65.0 together with netmask 255.255.254.0 (condensed notation: 192.31.65.0/23), subnet 12.2 is defined via IP address 192.31.60.4 with netmask 255.255.255.0 (condensed notation: 192.31.60.4/24) and subnet 12.3 is defined via IP address 192.31.63.2 and netmask 255.255.255.0 (condensed notation: 192.31.63.2/24). The subnet 12.3 includes a network management station 1, which, in turn, includes a topology module 9 and an SNMP manager 6 which receives management information, such as data pertaining to forward tables 5.1-5.6 of switches 3.1-3.6. The SNMP manager 6 collects the information coming from the management information bases 8 and hands them over to the topology module 9, where the layer-2 topology of the subnet 12.1 is created. Then, the topology is forwarded to a graphical user interface 10, which processes the data for displaying them.

The topology module 9 is a computer program which determines the layer-2 topology of the IP subnet 12.1. The network management system 1 further comprises a GUI interface 10 by means of which the topology determined by the topology module 9 is processed to be displayed on a video display. The default gateway 2 further comprises an SNMP agent 7 which is coupled to an MIB II (management information base) 8 which includes a routing table 11. The routing table 11 indicates where to forward incoming IP packets to other routers. The default gateway 2 features interfaces to the three different subnets 12.1, 12.2, and 12.3 to which it forwards IP packets according to their IP addresses and the indications in the routing table 11. The SNMP agent 7 is used to control the MIB II 8 of the default gateway 2. Each switch 3 and the end device (PC) 4 also includes an SNMP agent 7 which controls the MIB II 8 of the switches 3 and end device 4. However, the MIB II 8 of the PC 4 is not queried in the example because end devices are assumed to be not interconnecting other devices. Thus, they are not discriminative to draw a topology, and it is only interesting to locate them in the topology. They are only dead-ends in the topology. Each MIB II 8 of the switches 3 includes a forward table 5.1-5.6 which indicates to which ports incoming frames are forwarded, based on the MAC address.

The information stored in the forward tables 5.1-5.6 is determined by means of a backward learning algorithm. To this end, traffic is generated in the subnet 12.1. In fact, initially every switch 3 is polled for some MIB II parameters, such as layer-2 management address or default gateway address (since all interconnect devices having the same default gateway address are put into one initial group). These queries to all switches 3 force the backward learning algorithm. However, the required information could be obtained otherwise (external documentation database for instance). Then, ping requests are necessary nevertheless so that the forward tables 5 include downlink information. Subsequent refreshes may be needed (if elapsed time is longer than forward table lifetime). To this end, any layer-3 traffic can be generated. It will force address resolution of layer-3 addresses to layer-2 addresses and will thus refresh the forward tables 5. ICMP echo (ping) is convenient because it generates small network packets, and is widely supported. To demonstrate the backward learning algorithm, it is assumed that the network management station 1 sends a ping request to switch 3.4 of the IP subnet 12.1. It addresses switch 3.4 by means of its IP address.

Figure 3:
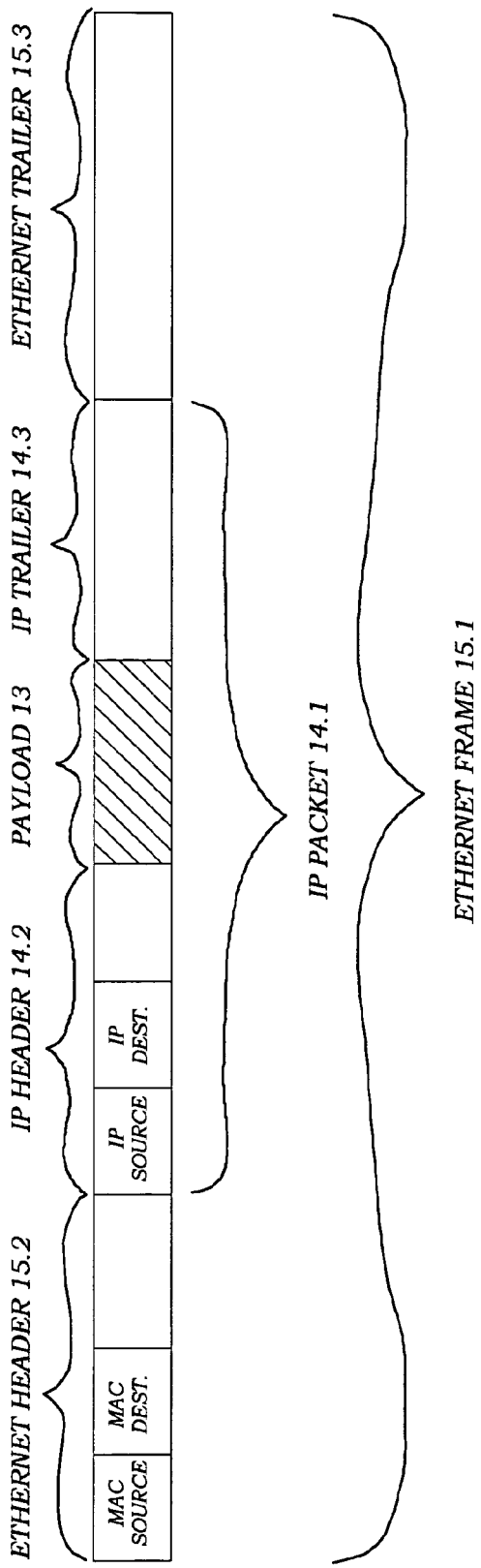
FIG. 3 shows a data unit format including an IP packet encapsulated in an Ethernet frame.

Before proceeding further with the description of FIG. 1, some items of FIG. 3 are explained. In FIG. 3, it is shown how data is encapsulated when sending it via the subnet. A payload 13 is encapsulated by headers and trailers for each layer, except the physical layer, of the ISO-OSI reference model. FIG. 3 does not show all headers and trailers of all layers but only the headers and trailers of the second (data link layer) and third layer (IP layer) which are important in terms of forwarding and routing the payload 13 from one switch or router to another switch or router. The headers 14.2, 15.2 of layer-2 and layer-3 contain the source and destination addresses of the data to be sent. An IP header 14.2 includes inter alia an IP source address and an IP destination address. The IP packet 14.1, in turn, is encapsulated by means of an Ethernet header 15.2 and Ethernet trailer 15.3.

Returning again to FIG. 1, the ping request, having the IP and MAC source addresses of the network management station 1 in its IP and Ethernet header, comes to the default gateway 2 of the IP subnet 12.1. In the default gateway 2, the MAC source address of the network management station 1 is changed into the 48-Bit MAC source address of the default gateway 2, which is abbreviated as DG. The Ethernet frame 15.1 is forwarded to switch 3.1 and the MAC address DG is associated with port 1 of the switch 3.1. In the forward table 5.1 of the MIB II 8, an association between port 1 and MAC address DG is stored. In order to forward the Ethernet frame 15.1, the MAC destination address of the Ethernet header 15.2 is considered. Since initially, the forward table 5.1 of switch 3.1 is empty, the switch 3.1 decides to forward the Ethernet frame 15.1 via all other ports (port 2 and 3 of switch 3.1) except the incoming port (port 1). This mode of forwarding, which is also referred to as flooding (indicated as curly arrows next to an "F"), is always performed if a MAC destination address of an incoming frame is not known in a forward table 5 of a switch 3. In the given example, the frame forwarded via ports 2 and 3 of switch 3.1 is sent to port 1 of switch 3.2 and port 1 of switch 3.3. These ports, as soon as the frame arrives, are associated with the MAC source address of the incoming frame. Switch 3.3, whose forward table 5.3 is initially empty, forwards the Ethernet frame 15.1 via ports 2 and 3 to the port 1 of PC 4 and port 1 of switch 3.4. The port 1 of PC 4 and port 1 of switch 3.4 are associated with the MAC source address of the Ethernet header 15.2. Since switch 3.4 is the addressed switch, the Ethernet frame 15.1 is not forwarded anymore, but the MAC source address is associated with port 1 of switch 3.4. Up to this point, the MAC source address of the Ethernet frame 15.1, which is the MAC address of the default gateway 2 (DG), has been associated with port 1 of switch 3.1, 3.2, 3.3 and 3.4. It has also been associated with port 1 of switch 3.4. The backward learning algorithm shows its effect when a reply is sent back from switch 3.4 to the network management station 1. To this end, the IP source address of the IP packet coming from the network management station 1 is used as the IP destination address of the IP packet going back to the network management station 1. The former MAC source address, i.e. the MAC address of the default gateway 2 DG, is used as the MAC destination address. The former MAC and IP destination addresses, namely the addresses of switch 3.4, are used as MAC and IP source addresses. Starting from switch 3.4, this switch has now learnt that frames with MAC destination address DG are forwarded via port 1 (indicated as a dashed line), so that it is not necessary anymore to flood the frame via all ports. The frame arrives at switch 3.3, where the MAC source address is entered into the forward table 5.3. In the forward table 5.3 of switch 3.3, the information is stored that MAC destination address DG is reached via port 1. To this end, it forwards the frame via port 1 to switch 3.1, so that in switch 3.1, the MAC source address of the switch 3.4 is entered into the forward table 5.1. In the forward table 5.1 of switch 3.1, it is also stored that the default gateway 2 may be reached via port 1. It should be mentioned that a router typically has several IP addresses via which it is connected to different subnets. Each of these IP addresses may be considered as an interface by means of which different subnets are connected to one router. Then, after the frame has arrived at the default gateway 2, the IP destination address of the network management station 1 is considered. It is checked up in the routing table 11 via which interface of the default gateway 2 to forward the IP packet. Furthermore, the MAC address of the default gateway 2 is used as the MAC source address of the frame to be routed. The routing table 11 indicates the IP address 192.31.63.2 as the correct interface via which the frame is forwarded. The frame is then received at the network management station 1.

By sending a ping request to all the switches 3.1-3.6, the forward tables 5 of the switches 3 are filled with forwarding information. A ping request is not sent to PC 4 since it may not have a correct IP address and thus polling of this device may not be possible via layer-3. (Rogue devices have a wrong IP address which make them unreachable but still capable to generate noise/rogue traffic in the network.). Therefore, PC 4 is only identified via its MAC address which is found in forward tables of the switches 3. It should be mentioned that whenever a MAC address is associated with a port of a switch 3 in a forward table 5, a timestamp is provided with the MAC address. If, for a few minutes, the MAC address associated to a port is not received through the associated port, the association between the MAC address and the port is canceled. If a MAC destination address is seen for the second time, i.e. the address is already stored in the forward table 5, then the entry of the forward table 5 storing the destination address together with the port via which it is seen gets a new, more current timestamp. By means of this mechanism, a switch or end device may be unplugged from its current position, moved around in the building and plugged in again somewhere else, within a few minutes it will be back in normal operation, without any manual intervention. This algorithm also means that if a machine is quiet for a few minutes, any traffic sent to it will have to be flooded until it next sends a frame itself.

If only the network management station 1 sends requests to the switches 3 and the PC 4, then, since the network management station 1 is the only device sending a request, only the MAC address of the default gateway 2 is stored in the forward tables 5 of the switches 3 below. The MAC address of a switch 3.3 may also appear in switch 3.1 above since each switch 3 which has been queried (e.g. pinged) sends back data, and thereto, its MAC address is conveyed to switches 3 which are hierarchically above. "Above" as used herein means higher in topology, which means closer to the default gateway in terms of layer-2 topology. It should be mentioned that the forward tables only know about device on downlink ports due to the PING mechanism. ARP requests can (or may not) append to this information further information, so that the forward tables 5 also include information about devices on uplink ports. Hence, S1 will know about DG, S2-S6 and PC.

S2 will know about DG, S1 (and may know about any or all of S2-S6, PC).

S3 will know about DG, PC, S4-S6 (and may know about S1, S2).

S4 will know about DG, S5, S6 (and may know about S1-S3 and PC).

S5 will know about DG (and may know about S1-S4, S6 and PC).

S6 will know about DG (any may know about S1-S5 and PC).

The "may know about" mostly depends on the ARP broadcast mechanism.

The invention is robust to the unknown knowledge of devices on the uplink table, except the default gateway. Anything but the default gateway forward information is ignored on the uplink port.

However, it may also happen that a switch 3 on a low level has the MAC address of a high level switch 3 in its forward table 5, although a switch 3 does not initiate sending a message in bottom direction, but only initiates sending a message back in top direction to the default gateway 2 or management system 1. This may happen in response to ARP (address resolution protocol) requests. This protocol enables the MAC address of a known IP address to be figured out. In FIG. 1, switch 3.3 wants to send a message to the default gateway 2 but does not know the default gateway's 2 MAC address. To this end, it broadcasts an ARP request asking the devices in the subnet 12.1 what the MAC address is of the device having the IP address 192.31.65.0 (which is the IP address of the default gateway 2). In its Ethernet frame, this ARP request also includes the MAC address of switch 3.3 so that it is inserted in the forward tables 5 of new switches 3 in association to the port via which it arrives. When the ARP request reaches the default gateway 2, the default gateway 2 sends back its MAC address to the sender of the ARP request which is the switch 3.3. It should be mentioned that due to ARP requests of the switches 3, a MAC address of a switch 3 above may be found in a forward table 5 of a switch hierarchically below. Due to the ARP request initiated, the MAC address of switch 3.3 is therefore also found in the forward table 5.4 of switch 3.4 in association with port 1. This means that due to the fact that a MAC address of a switch 3 is found in the forward table 5 of a switch 3 beneath, it cannot be deduced simply from the forward tables 5 that one switch 3 is hierarchically below the other one. After each switch 3 has learnt to associate all MAC addresses of the subnet 12.1 with all its ports, each switch 3 may forward data efficiently. However, if for a few minutes, no data is received via a port of a switch 3, the address is not associated with the port anymore. For the functioning of the topology algorithm, according to embodiments of the invention, each switch 3 knows all switches 3 below itself (This is obtained by the ping refresh which makes sure that within a group or subgroup, all the switches 3 have an up-to-date forward table concerning the other devices of their group), but it does not have to know which switches 3 are above itself. Furthermore, it needs to know via which port the default gateway 2 is reachable, i.e. which port is the uplink port, but it does not have to know all further devices visible via the uplink port. For this, it is assumed each switch can report its default gateway and the default layer-2 address via MIB II data. This serves two needs. Initial grouping mechanism: two switches 3 that have different default gateways are supposed to be in different subnets and therefore are not in the same layer-2 topology. Since the switches 3 need to be able to communicate with their default gateway 2, at least for management traffic purpose, they necessarily are able to associate their default gateway layer-2 address with a port. This is by definition their uplink port.

Figure 2:
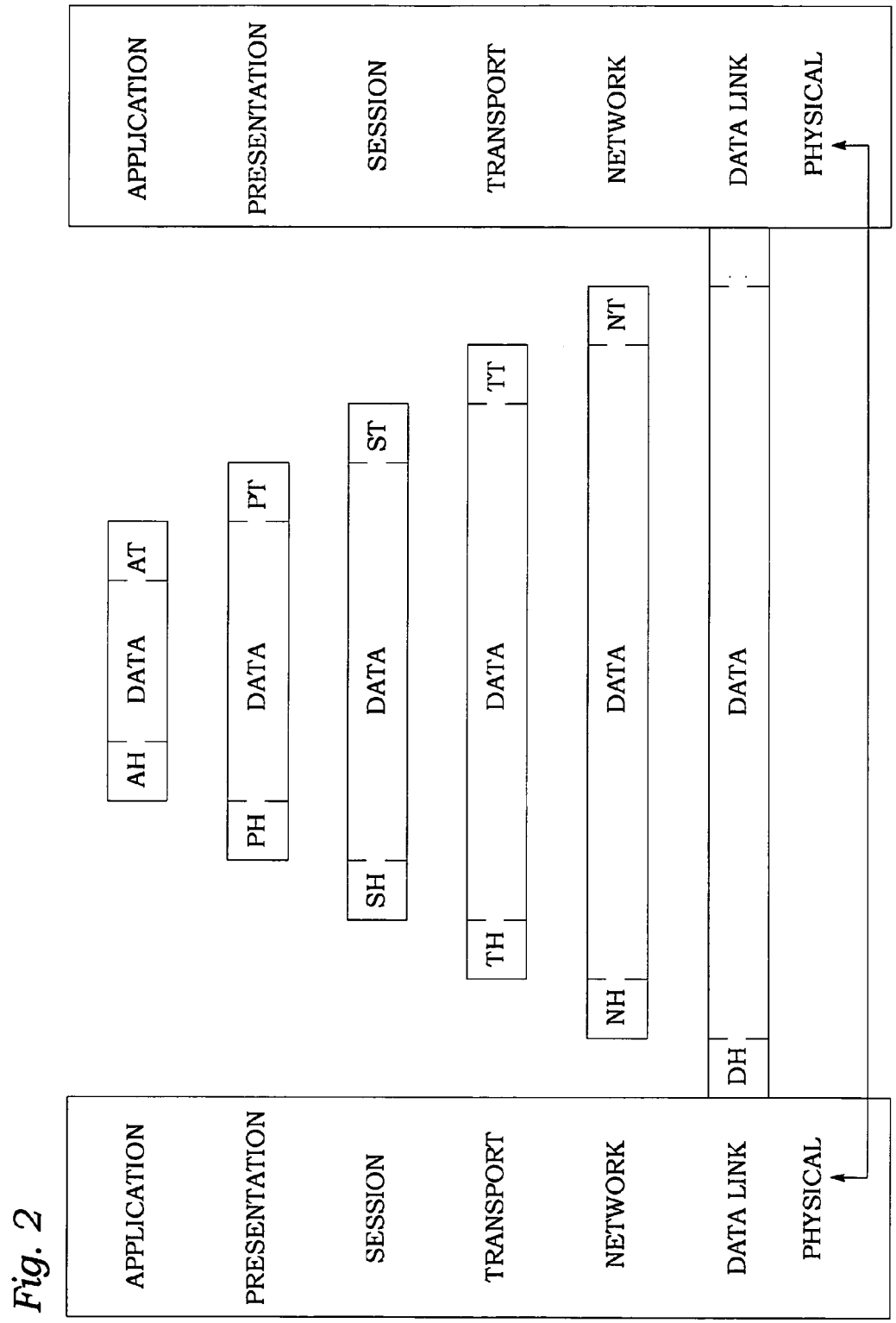
FIG. 2 shows transmission of information according to the ISO-OSI layer model.

FIG. 2 shows how information is transferred from a software application in one computer to an application in another as proceeded through the ISO-OSI layers. For example, if a software application in computer A has information to pass to a software application in computer B, the application program in computer A passes the information to the application layer (layer 7) of computer A, which then passes the information to the presentation layer (layer 6), which relays the data to the session layer (layer 5), and so on all the way down to the physical layer (layer 1). At the physical layer, the data is placed on the physical network medium and is sent across the medium to computer B. The physical layer of computer B receives the data from the physical medium, and then its physical layer passes the information up to the data link layer (layer 2), which relays it to the network layer (layer 3), and so on, until it reaches the application layer (layer 7) of computer B. Finally, the application layer of computer B passes the information to the recipient application program to complete the communication process. The seven OSI layers use various forms of control information to communicate with their peer layers in other computer systems. This control information includes specific requests and instructions that are exchanged between peer OSI layers. Headers and trailers of payload data at each layer are the two basic forms to carry the control information. Headers are prepended to payload data that has been passed down from upper layers. Trailers are appended to payload data that has been passed down from upper layers. An ISO-OSI layer is not required to attach a header or a trailer to payload data from upper layers. Each layer may add a header and a trailer to its data, which includes the upper layer's header, trailer and data, as it proceeds through the layers. The headers contain information that specifically addresses layer-to-layer communication. Headers, trailers and payload data are relative concepts, depending on the layer that analyzes the information unit. For example, the Transport Header (TH) contains information that only the Transport layer sees. All other layers below the Transport layer pass the Transport Header as part of their data. At the network layer, an information unit consists of a Layer 3 header (NH) and data. At the data link layer, however, all the information passed down by the network layer (the Layer 3 header and the data) is treated as data. In other words, the data portion of an information unit at a given OSI layer potentially may contain headers, trailers, and data from all the higher layers. This is known as encapsulation. For example, if computer A has data from a software application to send to computer B, the data is passed to the application layer. The application layer in computer A then communicates any control information required by the application layer in computer B by prepending a header to the data. The resulting message unit, which includes a header, the data and maybe a trailer, is passed to the presentation layer, which prepends its own header containing control information intended for the presentation layer in computer B. The message unit grows in size as each layer prepends its own header and trailer containing control information to be used by its peer layer in computer B. At the physical layer, the entire information unit is transmitted through the network medium.

The physical layer in computer B receives the information unit and passes it to the data link layer. The data link layer in computer B then reads the control information contained in the header prepended by the data link layer in computer A. The header and the trailer are then removed, and the remainder of the information unit is passed to the network layer. Each layer performs the same actions: The layer reads the header and trailer from its peer layer, strips it off, and passes the remaining information unit to the next higher layer. After the application layer performs these actions, the data is passed to the recipient software application in computer B, in exactly the form in which it was transmitted by the application in computer A.

One OSI layer communicates with another layer to make use of the services provided by the second layer. The services provided by adjacent layers help a given OSI layer communicate with its peer layer in other computer systems. A given layer in the ISO-OSI model generally communicates with three other OSI layers: the layer directly above it, the layer directly below it and its peer layer in other networked computer systems. The data link layer in computer A, for example, communicates with the network layer of computer A, the physical layer of computer A and the data link layer in computer B. The following chart illustrates this example.

FIG. 3 shows an Ethernet frame 15.1 which includes an Ethernet header 15.2 and an Ethernet trailer 15.3. The Ethernet header 15.2 includes a MAC source address and a MAC destination address. Within the Ethernet header 15.2 and trailer 15.3, there is the IP header 14.2 which includes the IP source and destination address. Furthermore, there is a payload 13 which is the actual data to be transmitted.

Figure 4:
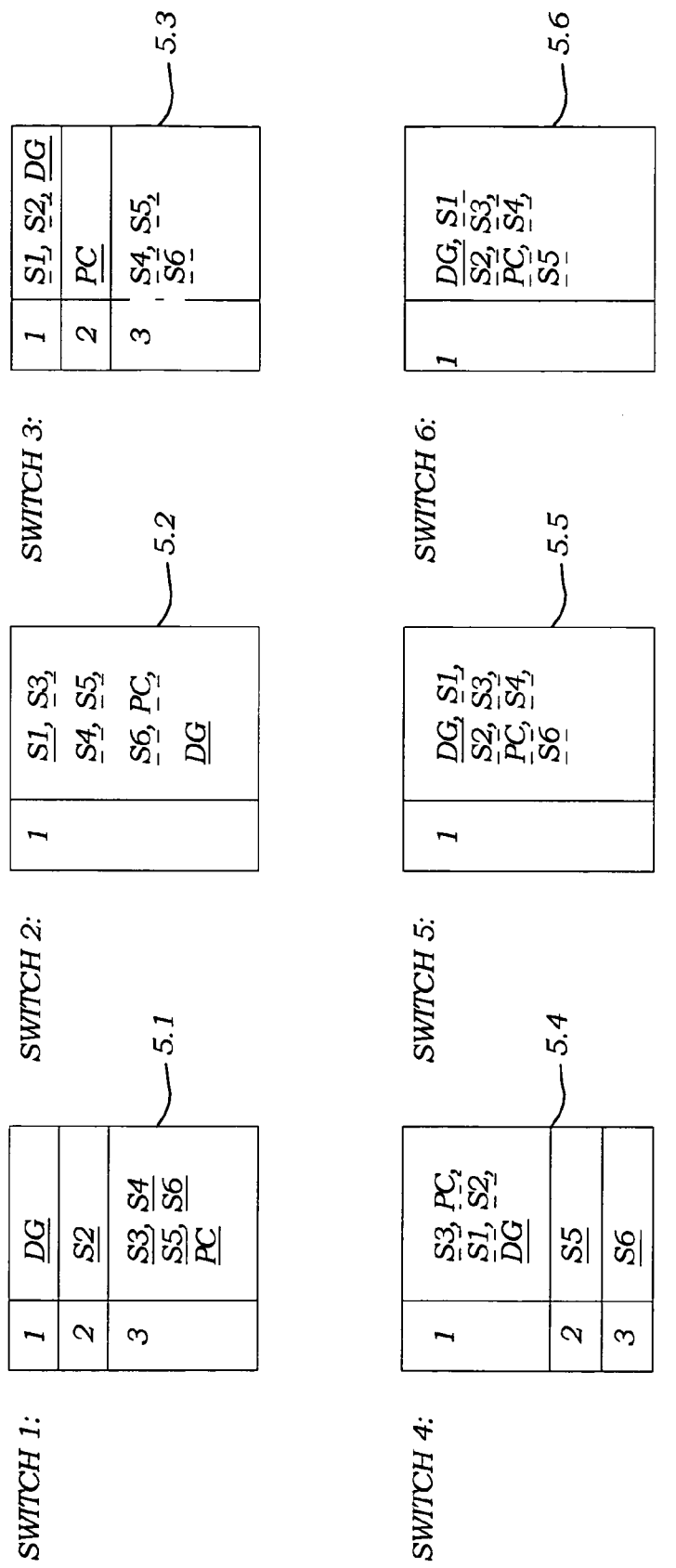
FIG. 4 illustrates exemplary forward tables of MIBs of layer-2 interconnect devices of the subnet.

FIG. 4 shows exemplary forward tables 5 of the six switches 3 of the subnet 12.1 of FIG. 1. The 48-bit-MAC addresses of the switches 3 which are enlisted in the forward tables 5 are abbreviated as S1, S2, S3, S4, S5, and S6. The MAC address of the default gateway 2 is abbreviated as DG, the MAC address of the end device as PC. The first column of each forward table 5 indicates via which ports the individual switches 3, indicated in the second column, are reachable. It should be mentioned that the end device (PC) 4 does not have a forward table 5 since it does not have to forward any incoming data to outgoing ports, but receives and sends its data via switch 3.3. It is indicated that the entries in the forward tables 5 are generated by means of the backward learning algorithm mentioned above. The forward tables 5 show complete forward information, i.e. the forward information for the case that all switches 3 know where to forward the data. One has to keep in mind that if no information is sent via a port for a few minutes, the entry in the forward table 5 is deleted. The port of each switch 3 via which the default gateway 2 is seen is regarded as an uplink port, whereas all the other ports are regarded as non-uplink ports. At all switches, port 1 is the uplink port, whereas the other ports are non-uplink ports. To obtain this complete information, the network management station 1 sends, at short intervals, ping requests to each individual switch 3, and furthermore, the switches send ARP requests which also distribute the MAC addresses of the switches 3 over the forward tables 5 of the switches 3. The underlined representation of MAC addresses refer to information which is definitely known by sending ping requests, whereas the MAC addresses with a dashed underlining refer to information which is known by ARP requests. It should be mentioned that the latter information is known in the example shown, but in general, this information is not necessarily known as explained above.

The question still has to be addressed where the network management station 1 gets all the IP addresses of the switches 3 from, i.e. how the network management station 1 knows which switches 3 and end devices 4 are available. A user can manually provide the IP addresses of the switches 3, or the IP address space of the subnet 12.1 is controlled and each IP address is pinged. The IP addresses of the switches 3 may be also provided by an external documentation database. Alternatively, a broadcast ping is used to get the IP addresses of the switches 3 of the subnet 12.1. To this end, a message with the broadcast address of the subnet 12.1 is sent by the network management station 1. Each switch 3 sends back its IP address to the sender's address of the ping. However, this mode of obtaining all IP addresses may be insecure due to a "smurf attack". An attacker fakes the sender's address of the ping in that it inserts a victim's address instead of its own. Each computer receiving the ping will send a ping reply to the victim. If the attacker chooses a ping frequency that is sufficiently high (1000 Ping/sec), so much traffic is generated on the line that it gets unusable. Indeed, many computers are configured in such a way that they do not reply to broadcast pings, so that broadcast pings are not always applicable to figure out all available switches and end devices.

Figure 5:
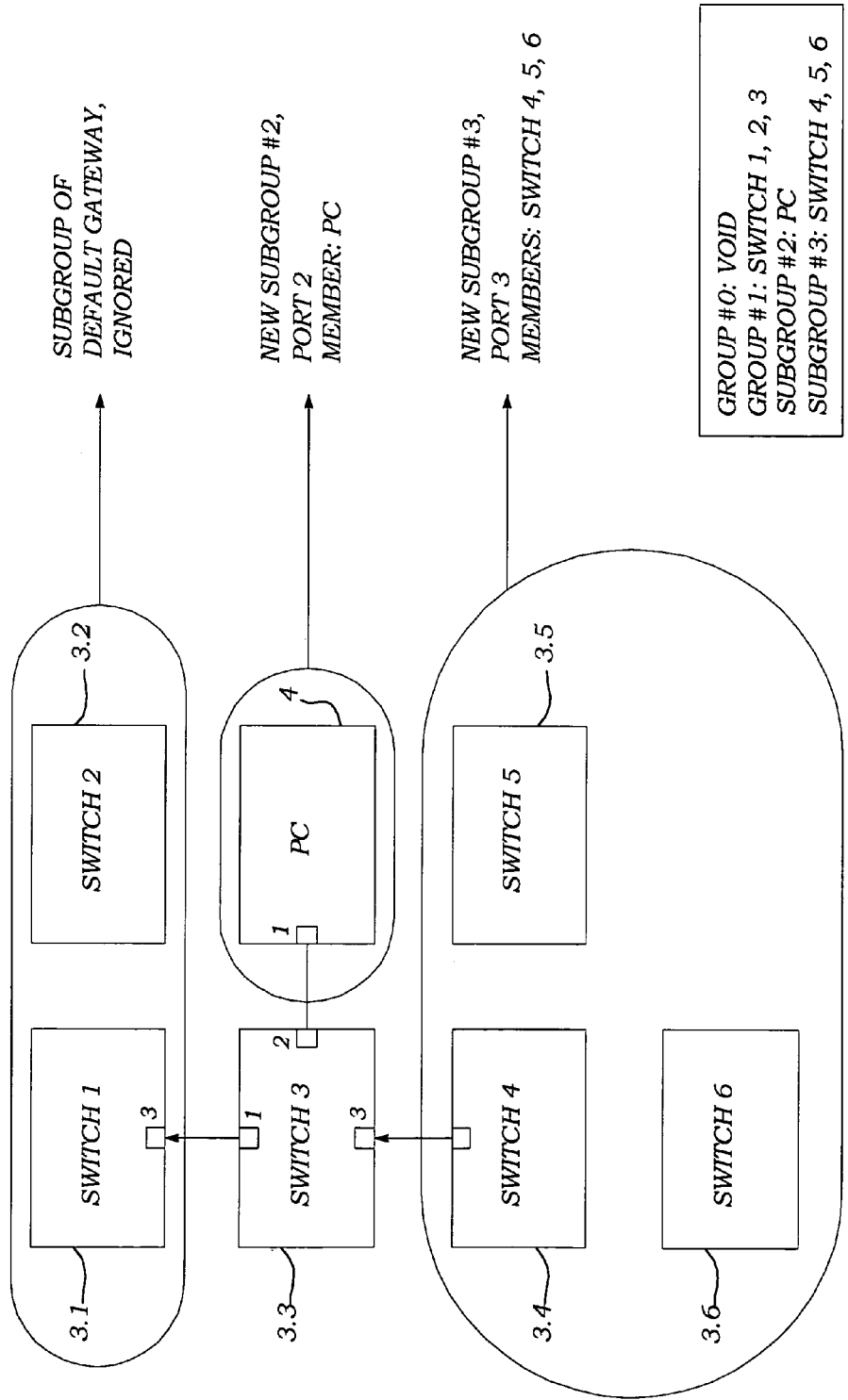
FIG. 5 illustrates an exemplary grouping of devices of the subnet into different subgroups, according to embodiments of the invention.

FIG. 5 illustrates how the layer-2 topology of the subnet 12.1 is determined. Initially, there are two groups: group #0 contains the end device 4 (PC), whose default gateway is unknown. The MAC address of the end device 4 only appears in forward tables 5 of other switches 3. Therefore, it is one task of the procedure to locate the end device 4 in the subnet 12.1. Group #1 contains all switches 3 whose default gateway is the same. (If there were another "switch 7" in another subnet, it would have been placed into a new initial group, because it would have a different default gateway MAC address. The initial grouping is performed by the initial polling of all switches.) For each switch 3, there is a forward table 5 and via port 1 of each switch 3, the switch 3 sees the default gateway 2. The switch 3.3 is selected from group #1, and it is queried about its forwarding information about all the other members of its group, with the addition of all the members of group #0. (Since the devices of group #0 could not reliably be put into one initial group, they can possibly belong to the current group.) Therefore, switch 3.3 is queried about the forwarding port for the layer-2 addresses of: S1, S2, S4, S5, S6 and PC. The forwarding information from switch 3.3 is then grouped by port:

port 1 (uplink port): S1 and S2 port 2: PC port 3: S4, S5, S6

Thus, three ports/groups have been obtained. The first one is the uplink port and is thus simply dismissed. The two remaining ones will trigger the creation of new subgroups.

According to the procedure, all switches 3 and end devices 4 reachable via an uplink port are ignored in that the switches 3 on the uplink port are left in their original group. The end device 4, which is reachable via port 2 is put into new subgroup #2. The switches 3.4, 3.5, and 3.6 are reachable via port 3 of switch 3.3 and are grouped into subgroup #3. Group #0 which initially contained end device 4 is now empty since the end device 4 is now in subgroup #2. For each new subgroup, information is stored about the ports through which the subgroups are reached.

Figure 6:
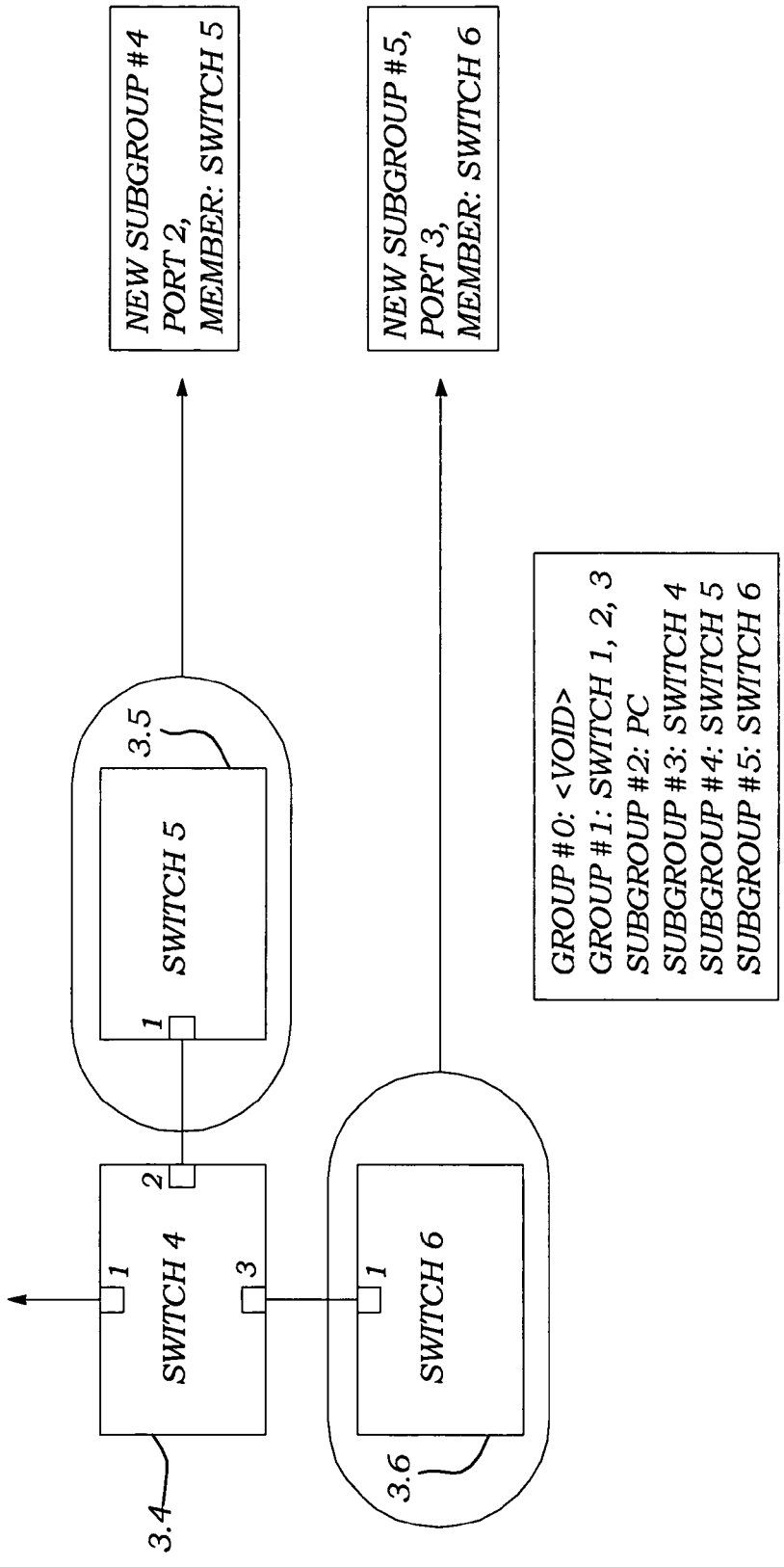
FIG. 6 illustrates an exemplary refinement of the grouping of devices, according to embodiments of the invention.

In FIG. 6, it is shown how the subgroups are further refined. Since, at that stage, the subgroup #2 only contains one end device 4, the subgroup #2 cannot be further refined. Subgroup #3, however, which contains three switches 3.4-3.6 may be further refined, in that switch 3.4 is selected from the subgroup #3 and a check-up is made into which further subgroups this subgroup decomposes. It should be mentioned that any other switch 3.4-3.6 of subgroup #3 could have equally been selected. The switch 3.5 which is connected to port 2 of switch 3.4 is assigned to new subgroup #4 and the switch 3.6 which is connected to port 3 of switch 3.4 is assigned to new subgroup #5. Now, all groups and subgroups, except group #1, are elementary in that they all contain either no selectable device (e.g. only end devices, no more interconnections so no query can be relevant) or one single selectable device (e.g. only one switch, so it cannot be queried about any other element) or no unselected switch 3 (e.g. if one has extracted all topology information but there must be a switch not participating in the procedure, so that only partial topology can be gathered). Only group #1 may still be decomposed into smaller subgroups.

Figure 7:
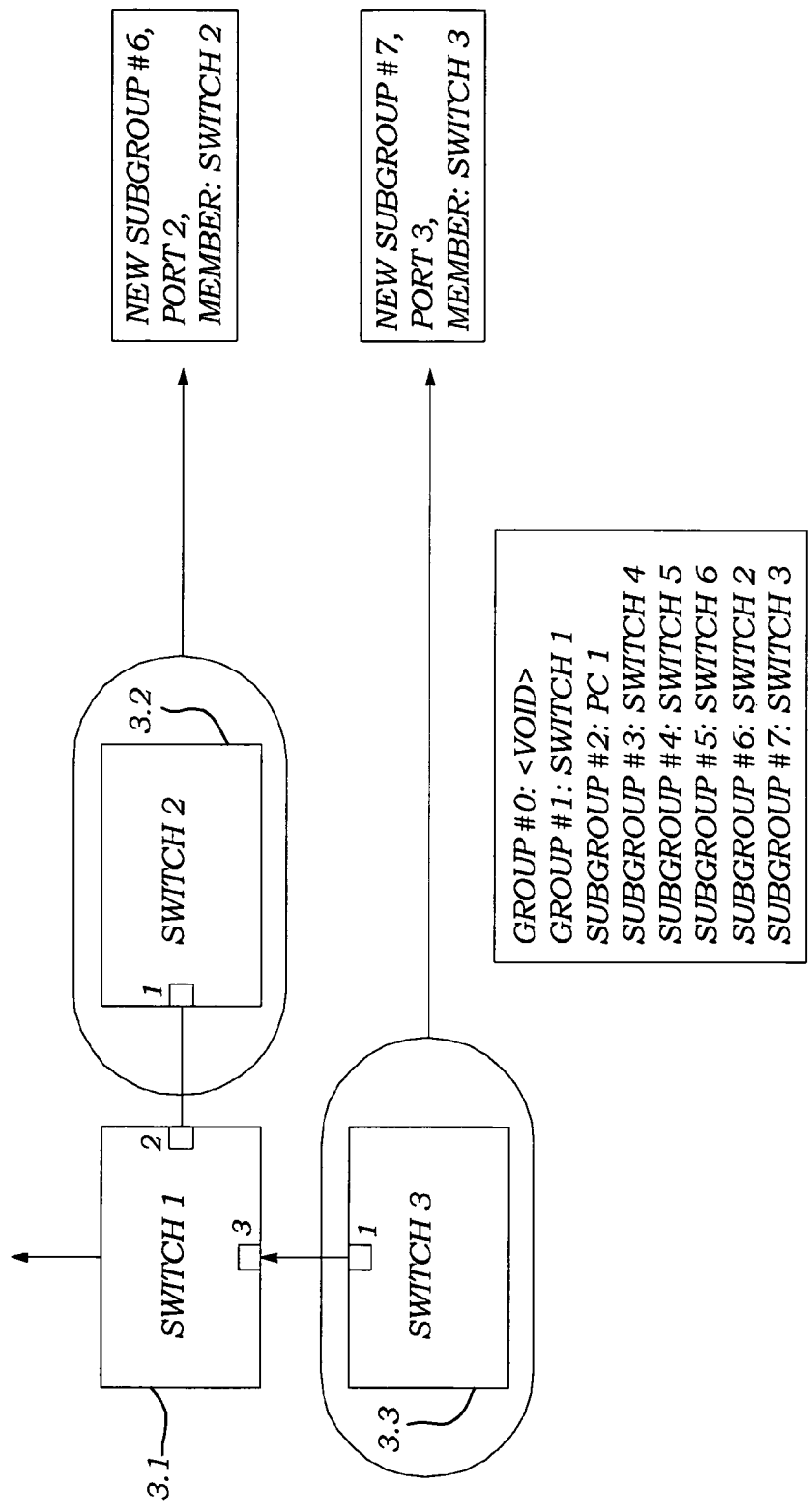
FIG. 7 illustrates a further refinement of the grouping of devices, according to embodiments of the invention.

In FIG. 7, switch 3.1 from subgroup #1 is selected. Switch 3.2 is connected to port 2 of switch 3.1, and switch 3.3 is connected to port 3 of switch 3.1. Switches 3.2 and 3.3 are connected via non-uplink ports so that each of the two switches 3.2 and 3.3 is put into an extra subgroup, namely subgroup #6, and subgroup #7. Now, each subgroup contains only end device(s) or one single interconnect device or multiple devices which do not seem to inter-communicate but via their uplink ports. This condition can happen when the procedure could not be applied to some switches of the topology (due to malfunction or misconfiguration), or when some switches are tied together with an advanced feature blurring the notion of port forwarding and hierarchical topology: e.g. port aggregation, meshing.

Figure 8:
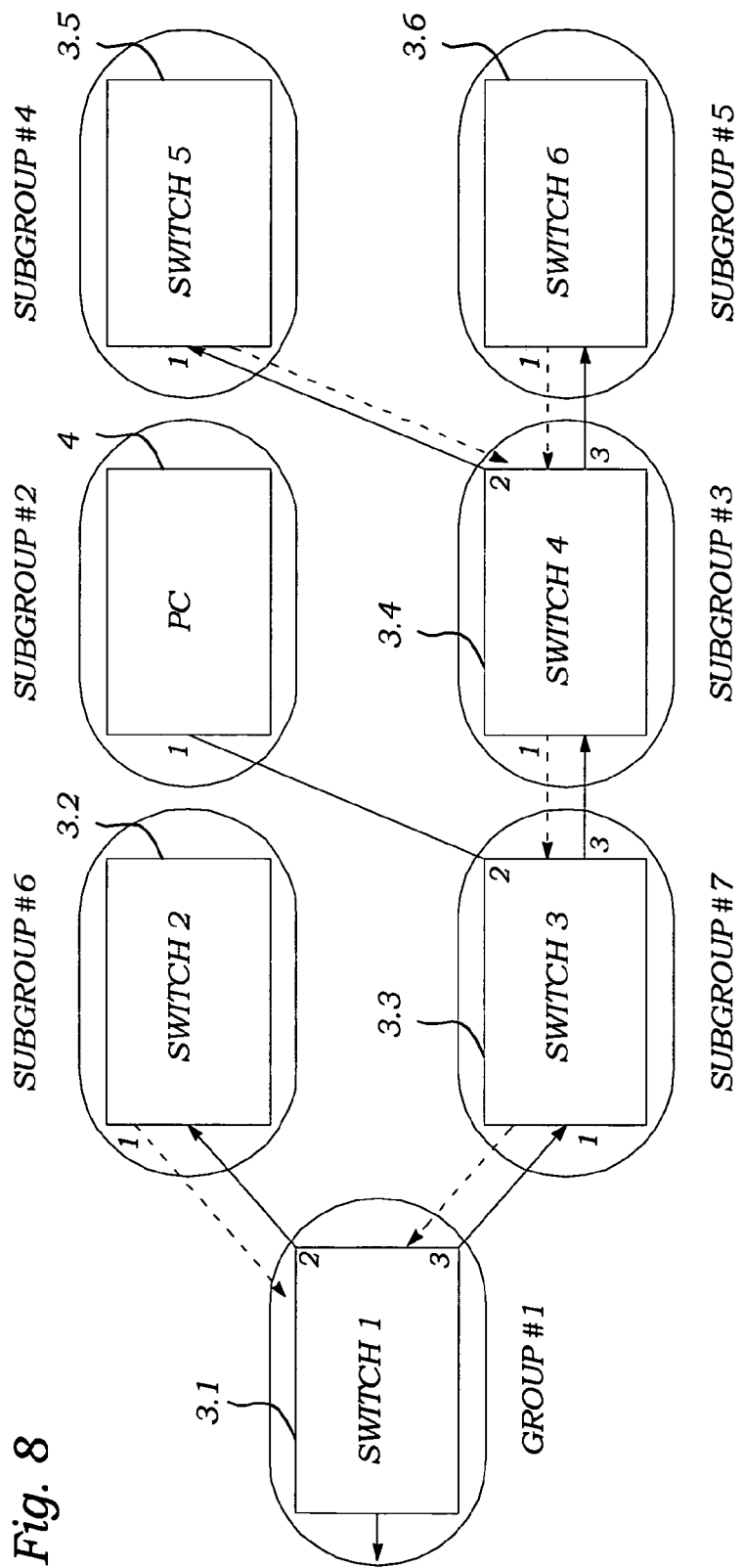
FIG. 8 shows a depiction of the layer-2 topology of the subnet, determined according to embodiments of the invention.

FIG. 8 shows how a graphical representation of the subnet 12.1 is obtained. To this end, it is started with switch 3.1 which is the uppermost switch of group #1 since it is remaining in group #1. Thus, no other switch from group #1 could reach it via a downlink port. (It should be mentioned that switch 3.1 is not necessarily unique in group #1. This may happen in particular cases when some switches in a procedure do not participate in the procedure. In the example, if one supposes switch 3.1 works normally regarding switching, but does not reply to SNMP queries for any reason (e.g. management IP address not configured), then the procedure would have ended with switch 3.2 and switch 3.3 at the top of the hierarchy: both would have remained in initial group #1 since no other switches could reach them via a downlink port, and none of the two can reach the other via a non-uplink port. Starting with switch 3.1, the downlink ports are recovered (they were initially stored and associated with subgroups as per the procedure). In FIG. 7, it is figured out that the subgroup #6 (containing only S2) is connected via port 2 of switch 3.1. Switch 3.3 is connected via port 3 of switch 3.1 to switch 3.1. The connections are drawn as lines in the diagram. Then, it is checked up via which port of switch 3.2 the default gateway 2 is reachable. From switch 3.2, it is port 1 via which the default gateway 2 is reachable and from switch 3.3, it is port 1, via which the default gateway 2 is seen. Since, according to the forward table 5.2, switch 3.2 can reach no other listed interconnect devices or end devices except via its uplink port, the branch of the hierarchy finishes with switch 3.2. Looking at switch 3.3, one sees that PC 4 is connected at port 2 of switch 3.3 and at port 3 of switch 3.3, switch 3.4 is connected to switch 3.3. Looking at switch 3.4, one notices, that port 1 is the port to the default gateway 2, so that a connection back to switch 3.3 is plotted in a dashed line. Switch 3.4 is connected to switch 3.6 via its port 3, and switch 3.5 is connected to switch 3.4 via port 2. Port 1 of switch 3.5 permits a return to switch 3.4, and from switch 3.6, port 1 provides a return to switch 3.4. Both connections are indicated as dashed lines. In a recursive manner, the structure has been walked through and a tree has been obtained. The tree is displayed on a computer monitor or is saved on a database.

Figure 9:
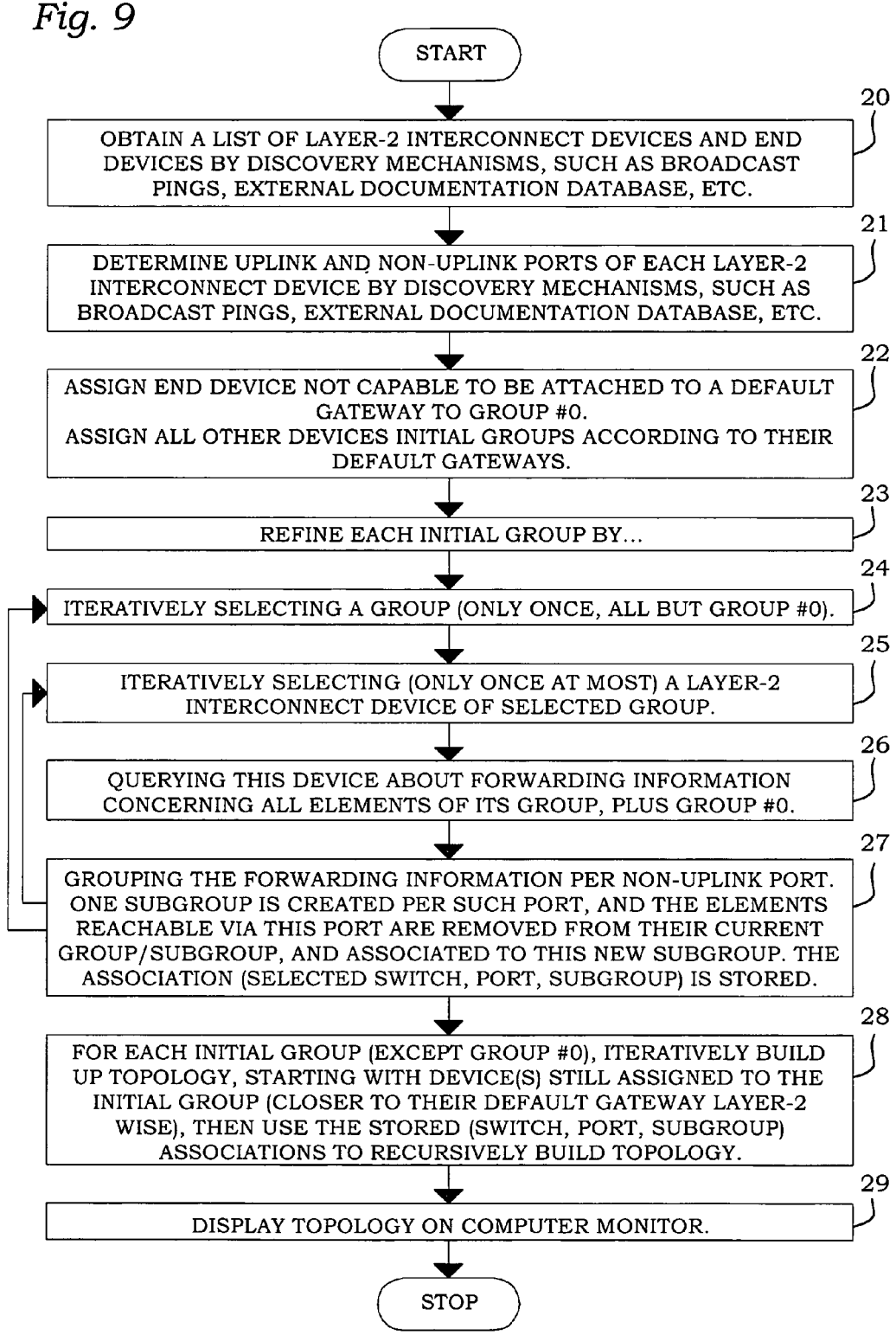
FIG. 9 shows a flowchart indicating the course of process of the method of determining a layer-2 topology, according to embodiments of the invention.

FIG. 9 shows a flowchart diagram indicating the course of process of the method described above. At 20, a list is obtained of layer-2 interconnect devices and end devices of the subnet whose topology is to be determined. The information can be obtained by means of discovery mechanisms, such as broadcast pings or an external documentation database. Then, at 21, uplink and non-uplink ports of each switch are determined. This information can be obtained via an external documentation database, via a GUI, via standard MIBII polling or any combination of these methods. At 22, all end-devices not capable to be attached to a default gateway are assigned to group #0, and all other devices are assigned to initial groups according to their default gateways. All devices having the same default gateway address are assigned to the same group. At 23, each initial group is individually refined. At 24, a group (except group #0) is selected and it is iteratively refined. At 25, a switch of current group is selected. At 26, the selected device is queried about forwarding information concerning all elements of its group, plus group #0. At 27, the forwarding information is grouped per non-uplink port. One subgroup is created per such port, and the elements reachable via this port are removed from their current group/subgroup, and associated to this new subgroup. The association (selected switch, port, subgroup) is stored. The iteration of steps 25, 26 and 27 stops when no more switch can be selected within current group. The iteration of steps 24, 25, 26 and 27 stops when all initial groups have been selected. At 28, for each initial group (except group #0) a topology is iteratively built up, starting with devices still assigned to the initial group. The stored (switch, port, subgroup) association is used to recursively build up the topology. At 29, the layer-2 topology of the subnet is displayed on a computer monitor.

Figure 10:
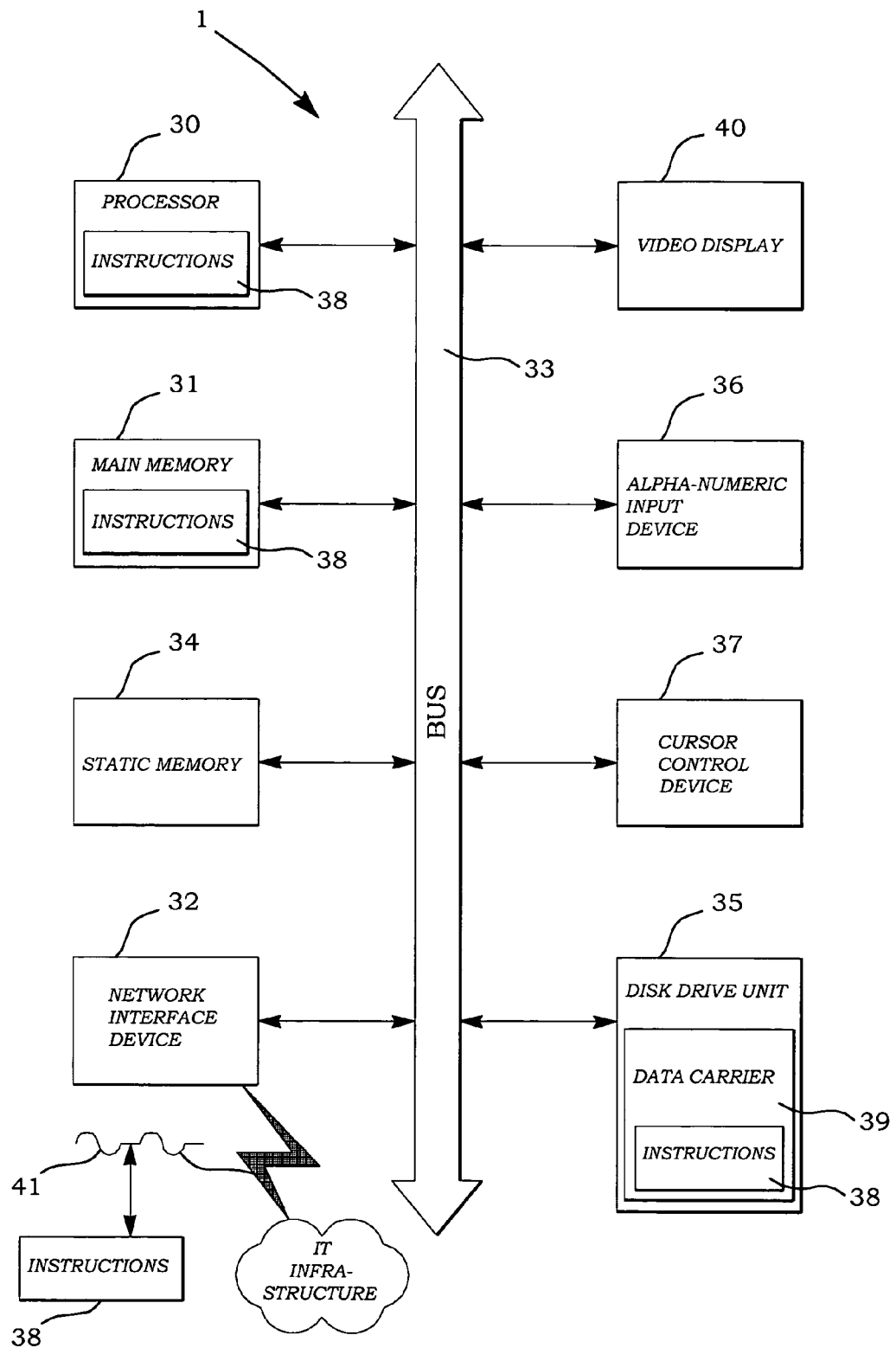
FIG. 10 is a diagrammatic representation of an embodiment of a network management station, according to embodiments of the invention.

FIG. 10 is a diagrammatic representation of a computer system which provides the functionality of the management system 1 of FIG. 1, and is therefore denoted as "management computer system 1". Within the management computer system 1 a set of instructions may be executed to enable the computer system to perform any of the methodologies discussed herein, may be executed. The management computer system 1 includes a processor 30, a main memory 31 and a network interface device 32, which communicate with each other via a bus 33. Optionally, it may further include a static memory 34 and a disk drive unit 35. A video display 40, an alpha-numeric input device 36 and a cursor control device 37 may form a management user interface. The network interface device 32 connects the management computer system 1 to the managed IT network 12. A set of instructions (i.e. software) 38 embodying any one, or all, of the methodologies described above, resides completely, or at least partially, in or on a machine-readable medium, e.g. the main memory 31 and/or the processor 30. A machine-readable medium on which the software 38 resides may also be a data carrier 39 (e.g. a non-removable magnetic hard disk or an optical or magnetic removable disk) which is part of disk drive unit 35. The software 38 may further be transmitted or received as a propagated signal 41 via the Internet and the IT network 12 through the network interface device 32.

Thus, the embodiments of the invention described above allow for an almost real time determination of layer-2 topology of IT infrastructures.

All publications and existing system mentioned in this specification are herein incorporated by reference.

Although certain methods and products constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A method of determining a layer-2 topology of an IT infrastructure comprising layer-2 interconnect devices having ports, the method comprising:
   obtaining a list of layer-2 interconnect devices and end devices available in the IT infrastructure,
   determining uplink and non-uplink ports of the layer-2 interconnect devices, wherein the uplink and non-uplink ports are determined by information stored in forward tables of the layer-2 interconnect devices, wherein the uplink ports of the layer-2 interconnect devices are the ports via which a root device is reachable and the non-uplink ports are all other ports,
   assigning all the, or a subset of the, layer-2 interconnect devices to one initial group, and
   iteratively refining the initial group by selecting a layer-2 interconnect device of the initial group and assigning all layer-2 interconnect devices reachable via its non-uplink ports to new subgroups.

2. The method of claim 1, wherein the list of layer-2 interconnect devices and end devices available in the IT infrastructure is obtained from an external documentation database.

3. The method of claim 1, wherein a list of layer-2 interconnect devices and end devices available in the IT infrastructure is obtained by sending a broadcast ping.

4. The method of claim 1, wherein the IT infrastructure has a tree structure or a tree structure is calculated on the IT infrastructure.

5. The method of claim 1, wherein the forward tables are filled according to a backward learning algorithm and traffic is created by polling individual layer-2 interconnect devices and end devices.

6. The method of claim 1, wherein the forward table of a layer-2 interconnect device stores which other devices are reachable via which port.

7. The method of claim 1, wherein the root device is a default gateway.

8. A computer system for determining a layer-2 topology of an IT infrastructure comprising layer-2 interconnect devices having ports, the computer system being programmed to:
   obtain a list of layer-2 interconnect devices and end devices available in the IT infrastructure,
   determine uplink and non-uplink ports of the layer-2 interconnect devices and end devices, wherein the uplink and downlink ports are determined by information stored in forward tables of the layer-2 interconnect devices, wherein the uplink ports of the layer-2 interconnect devices are the ports via which a root device is reachable and the non-uplink ports are all other ports,
   assign all the, or a subset of the, layer-2 interconnect devices to one initial group, and
   iteratively refine the initial group by selecting a layer-2 interconnect device of the initial group and assign all layer-2 interconnect devices reachable via its non-uplink ports to new subgroups.

9. A computer-readable medium having stored thereon, computer-executable instructions that, if executed by a machine, cause the machine to perform a method comprising:
   obtaining a list of layer-2 interconnect devices and end devices available in the IT infrastructure,
   determining uplink and non-uplink ports of the layer-2 interconnect devices, wherein the uplink and downlink ports are determined by information stored in forward tables of the layer-2 interconnect devices, wherein the uplink ports of the layer-2 interconnect devices are the ports via which a root device is reachable and the non-uplink ports are all other ports,
   assigning all the, or a subset of the, layer-2 interconnect devices to one initial group, and
   iteratively refining the initial group by selecting a layer-2 interconnect device of the initial group and assigning all layer-2 interconnect devices reachable via its non-uplink ports to new subgroups.

* * * * *